US009108515B2

(12) United States Patent
Nishio et al.

(10) Patent No.: US 9,108,515 B2
(45) Date of Patent: Aug. 18, 2015

(54) VEHICLE BRAKE DEVICE

(75) Inventors: Akitaka Nishio, Kariya (JP); Masayuki Naito, Nagakute (JP); Masahiro Matsuura, Chiryu (JP)

(73) Assignee: ADVICS CO., LTD., Kariya, Aichi-pref (JP)

( * ) Notice: Subject to any disclaimer, the term of this patent is extended or adjusted under 35 U.S.C. 154(b) by 0 days.

(21) Appl. No.: 14/115,475

(22) PCT Filed: Jul. 23, 2012

(86) PCT No.: PCT/JP2012/068607
§ 371 (c)(1),
(2), (4) Date: Nov. 4, 2013

(87) PCT Pub. No.: WO2013/015248
PCT Pub. Date: Jan. 31, 2013

(65) Prior Publication Data
US 2014/0095046 A1    Apr. 3, 2014

(30) Foreign Application Priority Data

Jul. 25, 2011    (JP) .................................. 2011-161982

(51) Int. Cl.
*B60L 7/26*    (2006.01)
*B60T 1/10*    (2006.01)
(Continued)

(52) U.S. Cl.
CPC ... *B60L 7/26* (2013.01); *B60T 1/10* (2013.01); *B60T 8/4872* (2013.01); *B60T 13/146* (2013.01);
(Continued)

(58) Field of Classification Search
CPC .......... B60T 2270/60; B60T 2270/602; B60T 2270/603; B60T 2270/604; B60T 13/586; B60L 7/26

USPC ................................................ 701/71, 74, 81
See application file for complete search history.

(56) References Cited

U.S. PATENT DOCUMENTS 5,472,265 A * 12/1995 Ohnuma ........................... 303/3
6,687,593 B1 * 2/2004 Crombez et al. ................ 701/71
(Continued)

FOREIGN PATENT DOCUMENTS

JP    11-115743 A    4/1999
JP    11-334567 A    12/1999
(Continued)

OTHER PUBLICATIONS

International Search Report for PCT/JP2012/068607 dated Oct. 30, 2012.

*Primary Examiner* — John Q Nguyen
*Assistant Examiner* — Michael Whalen
(74) *Attorney, Agent, or Firm* — Sughrue Mion, PLLC

(57) ABSTRACT

A vehicle brake device comprises a hydraulic brake device, a regeneration brake device and a brake control device. The brake control device further includes a final value calculating device for calculating the target braking force FR at the time when an ABS control period ended and the cooperative control device restarted the operation to be as a regeneration allowing braking force FH, when the anti-lock brake control device has operated for the ABS control period within one braking operation period where the brake operating member is continuously operated and a regeneration allowing device operable after the ABS control period ended within the one braking operation period and after the cooperative control device restarted the operation and allowing the generation of the regeneration braking force FE only when the target braking force is less than a value of the regeneration allowing braking force FH.

2 Claims, 10 Drawing Sheets

(51) Int. Cl.
*B60T 13/14* (2006.01)
*B60T 13/66* (2006.01)
*B60T 13/68* (2006.01)
*B60T 13/58* (2006.01)
*B60T 8/48* (2006.01)

(52) U.S. Cl.
CPC ............ *B60T 13/586* (2013.01); *B60T 13/662* (2013.01); *B60T 13/686* (2013.01); *B60T 2270/602* (2013.01); *B60T 2270/604* (2013.01)

(56) References Cited

U.S. PATENT DOCUMENTS

| | | | |
|---|---|---|---|
| 6,709,075 B1 * | 3/2004 | Crombez et al. | 303/152 |
| 7,152,934 B2 * | 12/2006 | Fuhrer et al. | 303/152 |
| 2005/0127750 A1 * | 6/2005 | Fuhrer et al. | 303/152 |
| 2010/0117567 A1 * | 5/2010 | Jeon et al. | 318/376 |
| 2010/0138117 A1 * | 6/2010 | Witte | 701/48 |
| 2014/0145499 A1 * | 5/2014 | Nishio et al. | 303/3 |

FOREIGN PATENT DOCUMENTS

| | | | | |
|---|---|---|---|---|
| JP | 2001-097204 A | 4/2001 | | |
| JP | 2002-095107 A | 3/2002 | | |
| JP | 2004-099028 A | 4/2004 | | |
| JP | 3541646 B2 | 7/2004 | | |
| JP | 2007-196857 A | 8/2007 | | |
| WO | WO 03/066398 A1 * | 8/2003 | ............... | B60T 8/00 |
| WO | WO 03066398 A1 * | 8/2003 | | |

* cited by examiner

VEHICLE BRAKE DEVICE

CROSS REFERENCE TO RELATED APPLICATIONS

This is a National Stage of International Application No. PCT/JP2012/068607 filed Jul. 23, 2012, claiming priority based on Japanese Patent Application No. 2011-161982 filed Jul. 25, 2011, the contents of all of which are incorporated herein by reference in their entirety.

TECHNICAL FIELD

This invention relates to a brake device for a vehicle equipped with a hydraulic brake device and a regeneration brake device, and more particularly, to a braking operation process after ending of an anti-lock braking control operation by a brake control device which cooperatively controls the hydraulic brake device and the regeneration brake device.

BACKGROUND OF THE TECHNOLOGY

A hybrid vehicle which has both engine and motor/generator as a running drive source is generally structured to accumulate electric energy regenerated from the kinetic energy by the motor/generator during braking operation thereby to improve the fuel efficiency. In this sense, the motor/generator is considered to be the regeneration brake device which applies regeneration braking force to the drive vehicle wheels. Since sufficient braking force cannot be obtained by the regeneration brake device alone, normally a device for generating a basic hydraulic pressure braking force by a conventional hydraulic brake device, such as a master cylinder and a control hydraulic pressure braking force generated by pump is used in addition to the regeneration brake device for generating the regeneration braking force. Accordingly, a cooperative controlling of the hydraulic brake device and the regeneration brake device is necessary to effectively perform a braking operation.

According to such cooperative brake controlling, a target braking force which is a braking force intended by an operator of the vehicle is detected by an operating stroke amount of a brake operating member or a master cylinder pressure and the detected target braking force is covered by the basic hydraulic pressure braking force and the regeneration braking force so that the regeneration efficiency of the regeneration brake device can be improved. Further, if the sum of basic hydraulic pressure braking force and the regeneration braking force is insufficient for (smaller than) the amount of the target braking force, a control hydraulic pressure braking force is further generated to have the total of three braking forces agree to the target braking force.

Further, recently it has become a common practice that the brake device is equipped with an anti-lock brake control function (hereinafter, simply referred to as ABS control) in which, when a vehicle wheel shows a locking tendency, the braking force to be applied thereto is intentionally reduced to abide or suppress a possible locking of the vehicle wheel. However, the ABS control for a hybrid vehicle becomes complicated compared to the ABS control for a conventional gasoline powered vehicle. Accordingly, a new brake control technology has been proposed to solve the problem and one of such technologies is disclosed in a Patent Document 1.

The braking force control device disclosed in the Patent Document 1 includes a hydraulic pressure braking means (hydraulic brake device) and a regeneration braking means (regeneration brake device). The braking force control device further includes an ABS control completion judging means for judging whether an ABS control is ended or not and a regeneration braking prohibiting means for prohibiting the generation of the regeneration braking force when the ABS control is executed and prohibiting the generation of the regeneration braking force after the ABS control ended during braking operation. According to the inventors of the Patent Document 1, a discontinuous application of the braking force caused by the repetition of ON/OFF of regeneration braking force application and an increase of operation noise by the drive motor due to such repetition can be prevented to remove uncomfortable feeling from the operator of the vehicle.

DOCUMENT LIST OF STATE OF ART

Patent Document

Patent Document 1: JP3541646 B

DISCLOSURE OF INVENTION

Problems to be Solved

However, according to the braking force control device disclosed in the above Patent Document 1, when a slipping (tendency of locking) occurs at a drive wheel, to which a regeneration braking force is to be applied, the generation of the regeneration braking force is prohibited. This is because the regeneration braking force is not suitable for a sensitive braking operation by the ABS control. Instead, the hydraulic pressure braking force is used for sensitively performing braking control depending on a vehicle running condition. In such case, the braking operation by the regeneration braking force is transferred or changed to the braking operation by the hydraulic pressure braking force. Under such braking force transferring, a discontinuous application of the braking force is generated, which gives an uncomfortable feeling to the operator of the vehicle. Once the ABS control is ended, a regeneration cooperative braking operation is re-started. Then, the drive wheel is again slips and the condition of ABS control starting is established. Accordingly, such re-starting of regeneration cooperative braking operation is prohibited due to an increase of likelihood of generations of discontinuous application of braking force due to a repetitive ON/OFF operation of the regeneration braking force application. Such prohibition of re-starting of the regeneration cooperative braking operation continues for one braking operation period during which the braking operation is continuously performed and such prohibition is released to allow the regeneration cooperative braking operation for the next braking operation period.

According to the conventional technology explained above, since once the regeneration cooperative braking operation is prohibited after the ABS control ended, the regeneration efficiency becomes worse. Even if the regeneration cooperative braking operation is re-started after the ABS control ended, the ABS control is not necessarily re-started by the sure establishment of the ABS control starting condition. In other words, such condition depends on the change of the brake operating state or the amount of the regeneration braking force and in some cases such condition may not be established, allowing a chance of regeneration braking force to be generated. It is expected that the regeneration efficiency can be improved by reducing possible occurrence of repetitive hunting in which the starting and ending of the ABS control and ON/OFF of the regeneration braking operation within the one braking operation period.

The present invention was made in consideration with the above problems and the object of the invention is to provide a vehicle brake device which can improve a regeneration efficiency compared to a conventional device by generating a regeneration braking force within a range that a likelihood of re-starting of an ABS control after the ABS control ended for one braking operation period would not be increased.

Means for Solving the Problem

The feature in structure of the invention according to a first aspect made for solving the above problem is characterized in that a vehicle brake device comprises a hydraulic brake device which adjustably applies a hydraulic pressure braking force to vehicle wheels, a regeneration brake device which applies a regeneration braking force to a drive wheel of the vehicle wheels driven by a generator/motor, a brake control device including a target obtaining means for obtaining a target braking force corresponding to an operating amount of a brake operating member, a cooperative control means for cooperatively controlling the hydraulic brake device and the regeneration brake device to have a total braking force which is a sum of the hydraulic pressure braking force and the regeneration braking force agree to the target braking force and an anti-lock brake control means for prohibiting a generation of the regeneration braking force by stopping the operation of the cooperative control means when the cooperative control means is in operation and a locking tendency is shown at one of the vehicle wheels and suppressing a generation of locking at the one of the vehicle wheels by adjusting the hydraulic pressure braking force. The brake control device further includes a final value calculating means for calculating the target braking force at the time when an ABS control period ended and the cooperative control means re-started the operation to be a regeneration allowing braking force, when the anti-lock brake control means has operated for the ABS control period within one braking operation period where the brake operating member is continuously operated and a regeneration allowing means operable after the ABS control period ended within the one braking operation period and after the cooperative control means restarted the operation and allowing the generation of the regeneration braking force only when the target braking force is less than a value of the regeneration allowing braking force calculated by the final value calculating means.

The feature in structure of the invention according to a second aspect is characterized in that the vehicle brake device comprises a hydraulic brake device which adjustably applies a hydraulic pressure braking force to vehicle wheels, a regeneration brake device which applies a regeneration braking force to a drive wheel of the vehicle wheels driven by a generator/motor, a brake control device including a target obtaining means for obtaining a target braking force corresponding to an operating amount of a brake operating member, a cooperative control means for cooperatively controlling the hydraulic brake device and the regeneration brake device to have a total braking force which is a sum of the hydraulic pressure braking force and the regeneration braking force agree to the target braking force and an anti-lock brake control means for prohibiting a generation of the regeneration braking force by stopping the operation of the cooperative control means when the cooperative control means is in operation and a locking tendency is shown at one of the vehicle wheels and suppressing a generation of locking at the one of the vehicle wheels by adjusting the hydraulic pressure braking force. The brake control device further includes a minimum value calculating means for calculating a minimum value of the target braking force during an ABS control period to be a regeneration allowing braking force, when the anti-lock brake control means has operated for the ABS control period within one braking operation period where the brake operating member is continuously operated and a regeneration allowing means operable after the ABS control period ended within the one braking operation period and after the cooperative control means restarted the operation and allowing the generation of the regeneration braking force only when the target braking force is less than a value of the regeneration allowing braking force calculated by the minimum value calculating means.

The feature in structure of the invention according to a third aspect is characterized in that in the vehicle brake device according to the first of second aspect, the regeneration allowing means limits a magnitude of an allowing regeneration braking force corresponding to a magnitude of ABS estimated available force calculated by subtracting the target braking force from the regeneration allowing braking force.

The feature in structure of the invention according to a fourth aspect is characterized in that in the vehicle brake device according to any one of the first, second and third aspects, the regeneration allowing means is operated after a predetermined time passed after the end of the ABS control period within the one braking operation period and the cooperative control means restarted.

According to the vehicle brake device according to the first aspect, the brake control device calculates the target braking force at the time when an ABS control period ended and the cooperative control means restarted the operation to be a regeneration allowing braking force, when the anti-lock brake control means has operated for the ABS control period within one braking operation period and allows the generation of the regeneration braking force only when the target braking force is less than a value of the regeneration allowing braking force after the cooperative control means restarted the operation. It is noted that the regeneration allowing braking force is a target braking force at the time when the ABS control has ended and in other words, an amount of braking force for estimating the restarting of the ABS control operation. Accordingly, after the cooperative control means restarted, if the target braking force is less than the regeneration allowing braking force, there would be a very few chance for the ABS control means to be restarted. Thus, keeping the generation of regeneration braking force, the total braking force can agree to the target braking force. Thus, within one braking operation period, even after the ABS control means operated and ended the control operation, a generation braking force can be generated within a range that a likelihood of restarting of ABS operation would not increase so that the regeneration efficiency can be improved compared to a conventional device.

According to the vehicle brake device of the invention according to the second aspect, the brake control device calculates a minimum value of the target braking force during an ABS control period to be as a regeneration allowing braking force, when the anti-lock brake control means has operated for the ABS control period within one braking operation period and allows the generation of the regeneration braking force only when the target braking force is less than a value of the regeneration allowing braking force after the cooperative control means restarted the control operation. It is noted that the regeneration allowing braking force is the minimum target braking force where the ABS control means has not ended the operation within the ABS control period and similar to the invention of claim 1, the amount is an indication of an estimated amount for the ABS control means to be restarted. Accordingly, after the cooperative control means restarted, if the target braking force is less than the regeneration allowing braking force, there would be a very few chance for the ABS control means to be restarted. Thus, keeping the generation of regeneration braking force, the total braking force can agree to the target braking force. Thus, within one braking operation period, even after the ABS control means operated and ended the control operation, a generation braking force can be generated within a range that a likelihood of restarting of ABS operation would not increase so that the regeneration efficiency can be improved compared to a conventional device.

It is noted here that in the invention of the first or second aspect, after the cooperative control means restarted, if the target braking force becomes equal to or more than the regeneration allowing braking force, a likelihood for the ABS control means to be restarted is the same as the conventional devices. Therefore, generation of the regeneration braking force is not allowed as same as the case of the conventional devices. Accordingly, even if the ABS control means should restart the operation, the regeneration braking force is not necessarily transferred to the hydraulic pressure braking force and no uncomfortable feeling is given to the operator of the vehicle due to the continuing application of the same type braking force.

According to the invention of the third aspect, the regeneration allowing means limits a magnitude of an allowing regeneration braking force corresponding to a magnitude of ABS estimated available force calculated by subtracting the target braking force from the regeneration allowing braking force. Accordingly, a large regeneration braking force can be generated when the target braking force is largely decreased more than the regeneration allowing braking force, there would be very few chances for the ABS control means to be restarted. On the other hand, if the target braking force is decreased by a small amount than the regeneration allowing braking force, the potential chances for the ABS control means to be restarted would increase and accordingly, a small regeneration braking force is generated. Therefore, the regeneration braking force is generated after the ABS control ended and if the ABS control is re-started, keeping the generation of the regeneration braking force as explained above, the amount of transferring braking force from the regeneration braking force to the hydraulic pressure braking force is probabilistically reduced and the discontinuity of braking force under transferring and the uncomfortable feeling which the operator receives can be suppressed to minimum.

According to the invention of the fourth aspect, the regeneration allowing means is operated after a predetermined time passed after the end of the ABS control period within the one braking operation period and the cooperative control means restarted. This can stabilize and facilitate the transiting operation from the end the operation of ABS control by the ABS control means to the transferring to the cooperative control by the cooperative control means, suppressing the influences of possible various disturbances.

BRIEF EXPLANATION OF ATTACHED DRAWINGS

FIG. 5 shows an explanation of distribution of the hydraulic pressure braking force and the regeneration braking force and FIG. 5A shows that the regeneration allowing braking force is relatively large and FIG. 5B shows that the regeneration allowing braking force is relatively small;

FIG. 6 shows an explanation of distribution of the braking force to front and rear sides and FIG. 6A shows that the regeneration allowing braking force is relatively large and FIG. 6B shows that the regeneration allowing braking force is relatively small;

THE EMBODIMENTS FOR IMPLEMENTING THE INVENTION

Figure 1:
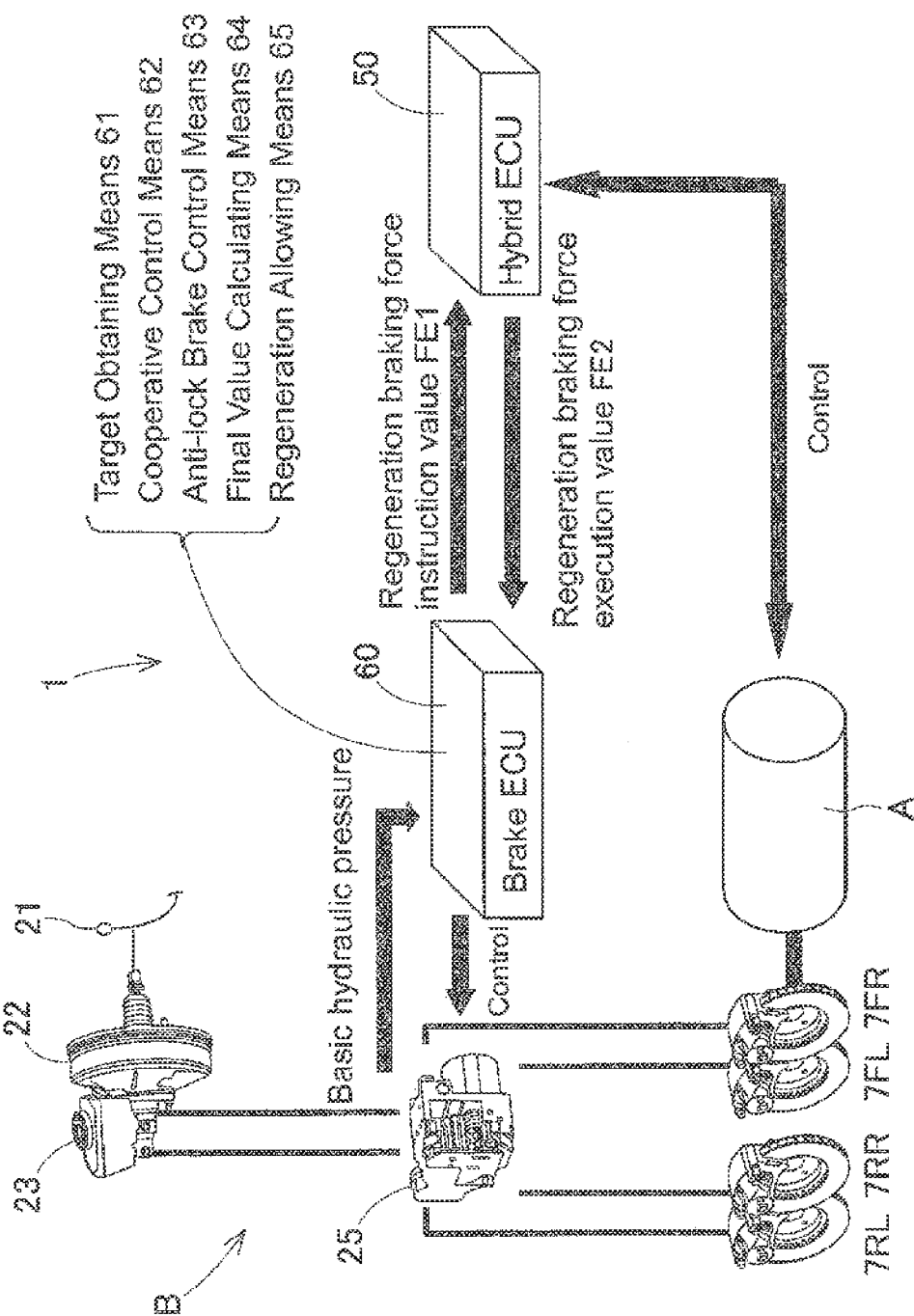
FIG. 1 is a conceptual view of a device structure of the vehicle brake device according to a first embodiment block view showing a brake device according to the invention.

The vehicle brake device according to the first embodiment of the invention will be explained with reference to the attached drawings, FIGS. 1 through 6. FIG. 1 shows an outline structure of the vehicle brake device 1 of the first embodiment. As shown in the drawing, the vehicle brake device 1 is formed mainly by a regeneration brake device A, a hydraulic brake device B, a hybrid ECU 50 and a brake ECU 60. The vehicle brake device 1 is installed in a front-drive, four-wheel hybrid vehicle and the braking force is normally generated in response to the depression of the brake pedal 21 by an operator of the vehicle. Independently from the normal braking operation, an anti-lock brake control function is equipped with the brake control device which suppresses or prevents locking of a vehicle wheel by adjusting the braking force, when a locking tendency is shown in a vehicle wheel 7FR, 7FL, 7RR and 7RL. The vehicle brake device further includes active cruise control function, brake assist function, a traction control function and an electronic stability control function.

The regeneration brake device A is formed by a motor/generator (not shown) and includes an inverter device and a battery device. The motor/generator is operated as a motor by being driven by the inverter device which converts the DC voltage of the battery device into the AC voltage and the motor/generator, as the motor, drives the drive wheels, front right wheel 7FR and front left wheel 7FL. The motor/generator is operated a generator by being driven by drive wheels 7FR and 7FL to charge the battery device through the inverter device. At this situation, a regeneration braking force FE is applied to the front right and front left wheels 7FR and 7FL by means of a reaction force from the motor/generator side. This function is generally called as a regeneration brake device A. The front right and front left vehicle wheels 7FR and 7FL are connected to the motor/generator by means of a common wheel axle to generate approximately the same amount of regeneration braking force FE at respective wheels. The physically possible maximum regenerative braking force FEmax1 at the regeneration brake device A is variable depending on the vehicle running state or charging condition of the on-vehicle battery device.

The hydraulic brake device B uses operation fluid as operation liquid and as shown in the Figures, formed by a brake pedal 21, a vacuum type brake booster 22, a master cylinder 23 and a hydraulic pressure control unit 25, etc. According to the hydraulic brake device B, depression force of the brake pedal 21 by the operator of the vehicle is boosted by the vacuum type brake booster. The boosted depression force operates the master cylinder to generate the basic hydraulic pressure therein. The basic hydraulic pressure and a control hydraulic pressure generated by a pump at the hydraulic pressure control unit 25 are applied to each wheel cylinder WC4, WC3, WC2 and WC1 provided at each vehicle wheel, a front right wheel 7FR, a front left wheel 7FL, a rear right wheel 7RR and a rear left wheel 7RL.

The hybrid ECU 50 is an electronic control device for controlling the power train of the hybrid vehicle as a whole and performs a cooperative control for an engine (not shown) and the motor/generator. The hybrid ECU 50 is connected to an inverter device to control the regeneration brake device A and monitor the maximum regenerative braking force FEmax of the regeneration brake device A.

The brake ECU 60 corresponds to the brake control device according to the invention which cooperatively controls the hydraulic brake device B and the regeneration brake device A. The brake ECU 60 controls the operation of the regeneration brake device B by instructing the regeneration braking force instruction value FE1 which is the target value of the regeneration braking force FE to the hybrid ECU 50 and receiving the regeneration braking force executing value FE1 which is the actual value of regeneration braking force FE from the hybrid ECU 50 using communications. Further, the brake ECU 60 controls the hydraulic brake device B by controlling the ON/OFF operation of the valves in the hydraulic pressure control unit 25 and the pump. The brake ECU 60 includes functions of a target obtaining means 61 which will be explained later, a cooperative control means 62, an anti-lock brake control means (ABS control means) 63, a final value calculating means 64 and a regeneration allowing means 65.

Figure 2:
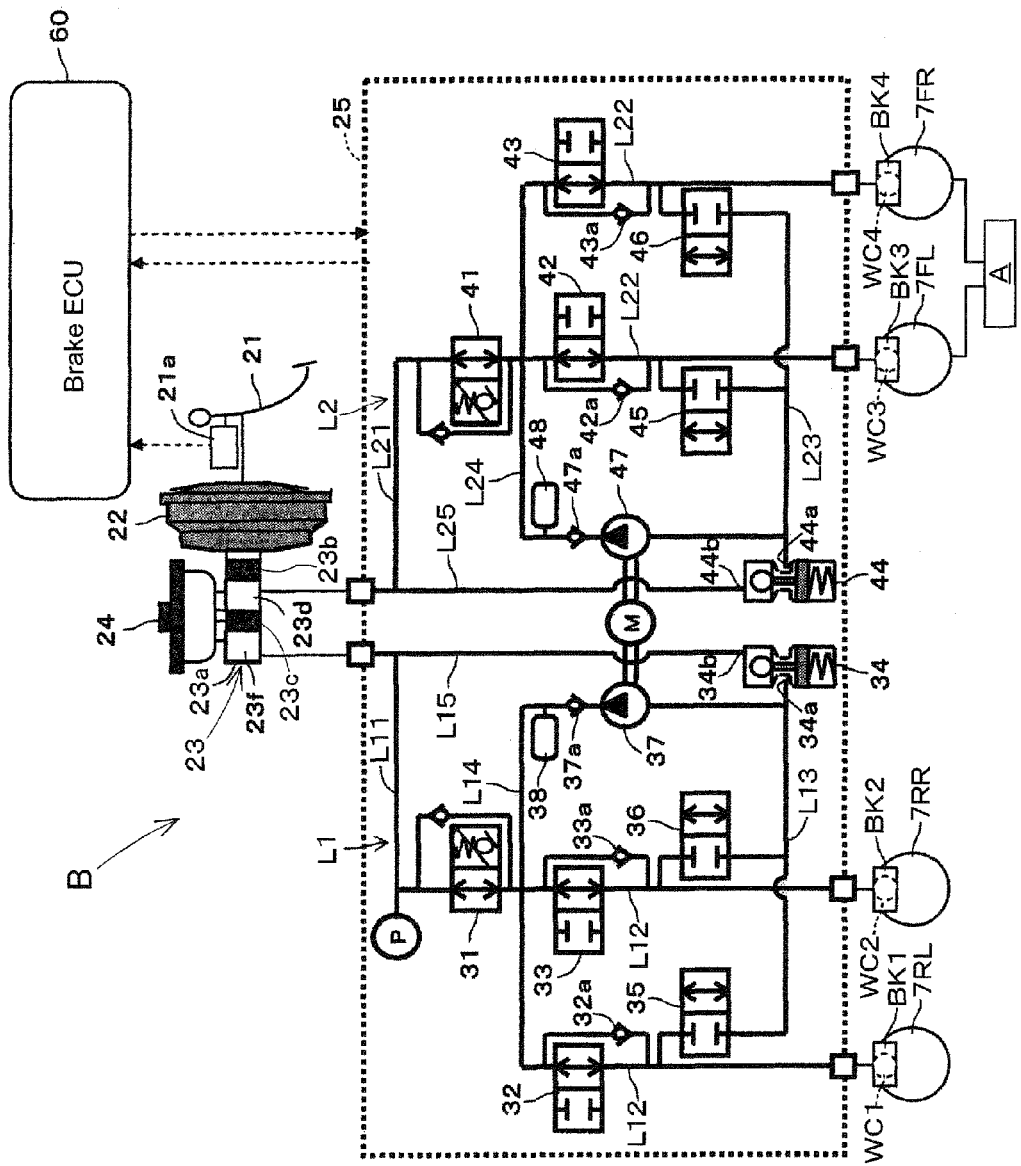
FIG. 2 is a view showing the structure of the hydraulic brake device shown in FIG. 1.

FIG. 2 is a view explaining the detail structure of the hydraulic brake device B shown in FIG. 1. The brake pedal 21 corresponds to the brake operating member of the invention and operates the vacuum type brake booster 22 in response to the depression operating amount. The stroke amount which corresponds to the operating amount of the brake pedal 21 is detected by a pedal stroke sensor 21a and a detection signal is outputted to the brake ECU 60. The vacuum type brake booster 22 utilizes the vacuum pressure supplied from the engine (not shown) to assist the depression operation of the brake pedal 21 to operate the master cylinder 23.

The master cylinder 23 is of a tandem type and includes a housing 23a which is of cylindrical shape having a bottom at one end and a first and a second piston 23b and 23c accommodated in the housing 23a and liquid-tightly and slidably movable within the housing 23a. a first hydraulic pressure chamber 23d is formed between the first and the second pistons 23b and 23c and a second hydraulic pressure chamber 23f is formed between the second piston 23c and the bottom portion of the housing 23a. The first and the second pistons 23b and 23c are driven by the vacuum type brake booster 22 to generate the basic hydraulic pressure in the first and the second hydraulic pressure chambers 23d and 23f.

A first port (shown, but not numbered) is provided at the master cylinder 23 which hydraulically connects the first hydraulic pressure chamber 23d and a reservoir 24 while the first piston 23d moves from a return position (an initial position where the brake pedal 21 is not operated) to an advanced position advanced with a predetermined stroke. Similarly, a second port (shown, but not numbered) is provided at the master cylinder 23 which hydraulically connects the second hydraulic pressure chamber 23f and the reservoir 24 while the second piston 23c moves from a return position to an advanced position advanced with a predetermined stroke. Accordingly, while the operating amount of the brake pedal 21 is small and the displacement amount of the first and the second pistons 23b and 23c is small, the first and the second hydraulic pressure chambers 23d and 23f are in fluid communication with the reservoir 24, no basic hydraulic pressure is generated. Thus, the regeneration braking force FE which corresponds to the target braking force FR is generated in priority to the generation of the basic hydraulic pressure while the operating amount of the brake pedal 21 is small. When the operating amount of the brake pedal 21 increases, the first and the second pistons 23b and 23c advance beyond the predetermined stroke and then the first and the second ports are closed to generate the basic hydraulic pressure thereafter.

The hydraulic pressure control unit 25 is formed by the hydraulic control valves 31 and 41, the pressure increase control valves 32, 33, 42 and 43 and the pressure decrease control valves 35, 36, 45 and 46, pressure modulating reservoirs 34 and 44, pumps 37 and 47 and motor M. the components of the unit 25 is packaged and housed in one case. As shown in FIG. 2, the brake conduit system of the hydraulic brake device B according to the first embodiment of the invention is formed by a front/rear conduit system having a first conduit system L1 which applies hydraulic pressure braking force to the rear right wheel 7RR and the rear left wheel 7RL and a second conduit system L2 which applies hydraulic pressure braking force to the front right wheel 7FR and the front left wheel 7FL. The first hydraulic pressure chamber 23d of the master cylinder 23 is connected to the second conduit system L2 and the second hydraulic pressure chamber 23f is connected to the first conduit system L1.

First, the first conduit system L1 of the hydraulic pressure control unit 25 will be explained hereinafter. A pressure differential type hydraulic pressure control valve 31 is provided in the first conduit system L1. The hydraulic pressure control valve 31 is switched over between the communication state and the pressure differential state by the control of the brake ECU 60. The state of the hydraulic pressure control valve 31 is normally the communication state and when the state is switched over to the pressure differential state, the pressure in the wheel cylinder WC1 and WC2 side conduit L12 can be kept higher than the basic hydraulic pressure in the master cylinder 23 side conduit L11 by a predetermined differential pressure. This pressure differential is the controlling hydraulic pressure and is obtained from the ejection pressure of the pumps 37 and 47, which will be explained later.

The conduit L12 is branched to two passages and the pressure increase control valve 32 is provided in one branch passage for controlling the pressure increase of the brake hydraulic pressure to the rear left side wheel cylinder WC1 of the rear left wheel 7RL. On the other hand, the pressure increase control valve 33 is provided in the other branch passage for controlling the pressure increase of the brake hydraulic pressure to the rear right side wheel cylinder WC2 of the rear right wheel 7RR. The pressure increase control valves 32 and 33 are of two-position type valve which can be switched over between the communication position and the communication interruption position by the control of the brake ECU 60. When the pressure increase valves are controlled to be in communication state, the basic hydraulic pressure from the master cylinder 23 or the total pressure of the control hydraulic pressure generated by driving pump 37 and the basic hydraulic pressure is applied to each wheel cylinder WC1 and WC2.

The conduit L12 between the pressure increase valves 32 and 33 and each wheel cylinder WC1 and WC2 is in communication with a reservoir bore 34a of the pressure modulating reservoir 34 via the conduit L13. The pressure decrease control valves 35 and 36 are provided in the conduit L13. The pressure decrease control valves 35 and 36 are switched over between the fluid communication state and fluid communication interruption state by the brake ECU 60.

Under the normal operation state where the ABS control means 63 is not operated, the pressure increase control valves 32 and 33 are in fluid communication state and the pressure decrease control valves 35 and 36 are in communication interruption state. When the ABS control means 63 is operated from the normal state, the pressure increase control valves 32 and 33 are closed under the pressure decrease mode and the pressure decrease control valves 34 and 35 are open. Then the operation fluid is discharged into the pressure modulating reservoir 34 via the conduit L13 to decrease the hydraulic pressure in the wheel cylinder WC1 and WC2 to prevent possible locking of the rear right and rear left wheels 7RL and 7RR.

Under the pressure increase mode of the ABS control means 63, the pressure decrease valves 32 and 33 are opened and the pressure decrease valves 35 and 36 are closed. Accordingly, the hydraulic pressure in the wheel cylinders WC1 and WC2 are increased to increase the braking force applied to the rear left wheel 7RL and the rear right wheel 7RR. Safety valves 32a and 32b are provided at respective pressure increase control valves 32 and 33, respectively in parallel with each other. The safety valves 32a and 33a are operated to return the operation fluid in the wheel cylinders WC1 and WC2 to the reservoir 24 when the depression of the brake pedal 21 during the ABS controlling is released.

Further, the pump 37 is provided together with a safety valve 37a in the conduit L14 which connects the reservoir bore 34a of the pressure modulating reservoir 34 with a portion of the conduit L12 positioned between the hydraulic pressure control valve 31 and the pressure increase control valves 32 and 33. A damper 38 is provided in the ejection side of the pump 37 to absorb the pulsation of the hydraulic pressure of the operation fluid when pumping the fluid to the conduit 12. The suction side of the pump 37 is connected to the reservoir bore 34a of the pressure modulating reservoir 34. A conduit L15 is provided for connecting another reservoir bore 34b with the fluid conduit L11 for allowing the communication between the pressure modulating reservoir 34 and the master cylinder 23.

The drive current of the motor M is adjusted upon receipt of instructions from the brake ECU 60 to adjust the ejection flow rate of the pump 37. The pump 37 is operated during the pressure decrease mode of the ABS control to suction the operation fluid in the wheel cylinders WC1 and WC2 or the operation fluid reserved in the pressure modulating reservoir 34 and return to the master cylinder 23 via the hydraulic pressure control valve 31 which is under the communication state. The pump 37 is used also for executing the functions of active cruise control, brake assist, traction control and electronic stability control by generating control hydraulic pressure.

In other words, the pump 37 suctions the operation fluid in the master cylinder 23 via the fluid conduits L11 and L15 to generate pressure differential in the hydraulic pressure control valve 31 which is switched over to the pressure differential state and ejects to each wheel cylinder WC1 and WC2 via the conduits L14 and L12 and the pressure increase valves 32 and 33 which are switched over to the fluid communication state to apply control hydraulic pressure thereto. Further, the pump 37 is operated to generate pressure differential to apply control hydraulic pressure to the wheel cylinders WC1 and WC2 in case a sufficient regeneration braking force FE cannot be obtained by the regeneration brake device A or the generation of the regeneration braking force is prohibited.

Further, a pressure sensor P is provided in the fluid conduit L11 for detecting the basic hydraulic pressure generated in the master cylinder 23. The detection signal is sent to the brake ECU 60. The pressure sensor P may be provided in the conduit L21 in the second conduit system L2.

Further, as similar to the structure of the first conduit system L1, the second conduit system L2 of the hydraulic pressure control unit 25 is structured. The second conduit system L2 is formed by the conduits L21 through L25. Valves are the same or similar to those in the first conduit system L1 and are provided similarly. A hydraulic pressure control valve 41 and a pressure modulating reservoir 44 are provided in the second conduit system L2. A pressure increase control valve 42 is provided in one of the branched conduits branched from the conduit L22 for controlling the pressure increase of the brake hydraulic pressure in the wheel cylinder WC3 of the front left wheel 7FL and another pressure increase control valve 43 is provided in the other of the conduits branched from the conduit L22 for controlling the pressure increase of the brake hydraulic pressure in the wheel cylinder WC2 of the rear right wheel 7RR. Further, the pressure decrease valves 45 and 46 are provided in the conduit L23 and a pump 47 is provided in the conduit L24.

The basic hydraulic pressure of the master cylinder 23 and the control hydraulic pressure generated by driving the pumps 37 and 47 and by controlling the hydraulic pressure control valves 31 and 41 are applied to each wheel cylinder WC1, WC2, WC3 and WC4 of the corresponding vehicle wheels 7RL, 7RL, 7FL and 7FR. When the basic hydraulic pressure and the control hydraulic pressure are supplied to each wheel cylinder WC1 through WC4, the brake means BK1 through BK4 are operated thereby to apply the basic hydraulic pressure braking force FB and the control hydraulic pressure braking force FC to the vehicle wheels 7RL, 7RL, 7FL and 7FR. As an example of the brake means BK1 through BK4, disc brake device or drum brake device is used which has a disc rotor or a brake drum to which a friction material such as brake pad or brake shoe is secured. The rotation of the vehicle wheels 7RL, 7RL, 7FL and 7FR, to each of which the disc rotor or the brake drum is secured for integral rotation therewith, is restricted.

Next, the function of the brake ECU 60 will be explained hereinafter. The target obtaining means 61 is a means for obtaining the target braking force FR which corresponds to the operating amount of the brake pedal 21. Naturally, the target braking force FR increases in response to the increase of the operating amount of the brake pedal 21. However, such relationship may not necessarily be a proportional relationship. The target obtaining means 61 uses a map indicating a relationship between the operating amount of the brake pedal 21 and the target braking force FR by a list.

The cooperative control means 62 is a means for cooperatively controlling the hydraulic brake device B and the regeneration brake device A so that the total braking force which is the sum of the hydraulic pressure braking force (sum of the basic hydraulic pressure braking force FB and the control hydraulic pressure braking force) and the regeneration braking force FE agrees to the target braking force FR. The cooperative control means 62 is provided for obtaining sufficient target braking force FR by the total braking force which is the sum of the basic hydraulic pressure braking force FB and the regeneration braking force FE generating the regeneration braking force as much as possible in addition to the basic hydraulic pressure braking force FB which is automatically generated in accordance with the operating amount of the brake pedal 21. If the target braking force is not sufficiently obtained, the cooperative control means 62 drives the pumps 37 and 47 of the hydraulic pressure control unit 25 to generate control hydraulic pressure braking force FC corresponding to the insufficient amount to the target braking force FR so that the total of three braking forces, the basic hydraulic pressure braking force FB, the control hydraulic pressure braking force FC and the regeneration braking force FE agree to the target braking force FR.

The anti-lock brake control means (ABS control means) 63 is a means for prohibiting the generation of the regeneration braking force by stopping the cooperative control of the cooperative control means 62 when a locking tendency is shown at any of the vehicle wheels 7RL, 7RL, 7FL and 7FR and at the same time adjusting the hydraulic pressure braking force to prevent locking of the vehicle wheel. The ABS control initiating condition for judging the locking tendency may be suitably determined by properly using a conventional technology. Further, the necessary braking force to be generated during the ABS controlling, i.e., the target braking force under ABS control FR (ABS) which is smaller than the target braking force FR determined by the operating amount of the brake pedal 21 can be determined by properly using a conventional technology. The ABS control means 63 controls to prohibit the generation of the regeneration braking force FE which is difficult to perform a sensitive or fine control and to adjust the control hydraulic pressure braking force FC by the hydraulic pressure control unit 25 thereby satisfying the target braking force under ABS control FR (ABS). After the locking tendency is detected to be ended, the ABS control is automatically ended to restart cooperative control by the cooperative control means 62 automatically.

The final value calculating means 64 is a means for calculating the target braking force FR to be as a regeneration allowing braking force FH at the time when the ABS control period ended and the cooperative control restarted when the ABS control means 63 is operated during the ABS control period within one braking operation period in which the brake pedal 21 is continuously operated. The final value calculating means 64 memorizes the target braking force FR at each time point in the ABS control period and calculates the target braking force FR at the time point that the ABS control ended, to be the regeneration allowing braking force FH.

It is noted that the regeneration allowing braking force FH is the target braking force FR when the locking tendency is ended. Accordingly, after the ABS control ended, if the target braking force FR becomes equal to or more than the regeneration allowing braking force FH, the ABS initiating judging condition is established to increase the likelihood of re-starting of the ABS control by the ABS control means 63. In other words, when the target braking force FR is less than the regeneration allowing braking force FH, the likelihood of re-starting of the ABS control is small and accordingly, the judgment is made to generate the regeneration allowing braking force FH. When the target braking force FR is equal to or more than the regeneration allowing braking force FH, it is judged not to generate the regeneration braking force FE.

The regeneration allowing braking force FH is cleared when the operator of the vehicle released the depression of brake pedal 21. The regeneration allowing braking force FH is not carried over to the next braking operation. This is because the road surface condition or the like is varied with the advancing running of the vehicle, which also varies the locking condition of the vehicle wheels 7RL, 7RR, 7FL and 7FR.

The regeneration allowing means 65 is a means operated after the restarting of the cooperative control means 62 and the ABS control period ended within one braking operation period for allowing the generation of the regeneration braking force FE only when the target braking force FR is less than the regeneration allowing braking force FH. As explained above, the regeneration allowing means 65 judges whether the generation of the regeneration braking force should be allowed or not based on the value of the target braking force FR being equal to or more than, or less than the regeneration allowing force. Further, the regeneration allowing means 65 restricts the magnitude of the allowing regeneration braking force FE corresponding to the magnitude of ABS estimated available force FK calculated by subtracting the target braking force FR from the regeneration allowing braking force FH. In other words, if the target braking force FR is greatly decreased from the regeneration allowing braking force FH, then the maximum allowable regeneration braking force FE, i.e., the allowable maximum regeneration braking force FEmax2 is set to be a large value and if the target braking force FR is decreased by a smaller amount from the regeneration allowing braking force FH, the allowable maximum regeneration braking force FEmax2 is set to be a small value. Physically possible generation of the maximum regeneration braking force FEmax1 by the regeneration brake device A is a different value from the allowable maximum regeneration braking force FEmax2 and this value can be obtained from the hybrid ECU 50 through communications. Accordingly, the value of the allowable maximum regeneration braking force FEmax2 allowed by the regeneration allowing means 65 does not exceed the value of the maximum regeneration braking force FEmax1 obtained through communications.

Figure 3:
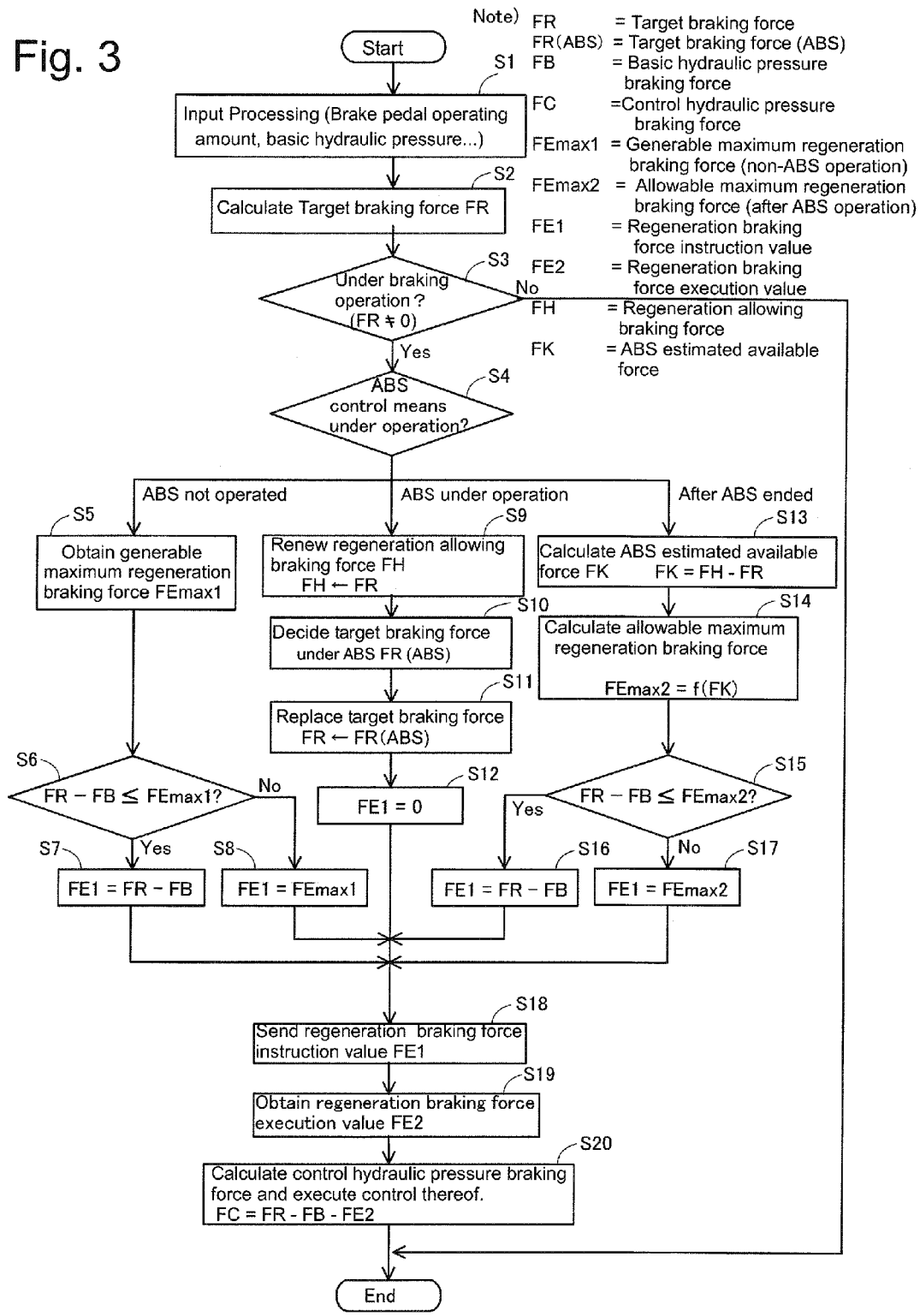
FIG. 3 is a flowchart explaining processing flow for brake control by brake ECU (brake control device) according to the first embodiment.

Next, the processing flow for the brake control by the brake ECU 60 will be explained with reference to the flowchart illustrated in FIG. 3. At the step S1 in FIG. 3, the brake ECU 60 executes the input processing. In more detail, the information on the operating amount of the brake pedal 21 is obtained from the pedal stroke sensor 21a and the information on the basic hydraulic pressure is obtained from the pressure sensor P in the hydraulic pressure control unit 25. Further, other information on the operation state of the hydraulic pressure control unit 25 is confirmed by the brake ECU 60. The basic hydraulic pressure braking force FB can be easily obtained based on the information on the basic hydraulic pressure obtained by the brake ECU 60. At the next step S2, the target obtaining means 61 calculates the target braking force FR and at the next step S3, whether the braking operation is under operation or not is judged by investigating whether the value of the target braking force FR is zero or not. If the value of the target braking force FR is found to be zero, it is judged that the braking operation has been ended and the processing flow ends.

At the step S3, if the value of the target braking force is found to be not zero and the braking operation is judged to be continuing, the program goes to the step S4 for investigating whether the ABS control means 63 is operating or not. If the ABS control means 63 is found to be not operated, the program goes to the step S5 and if the ABS control means 63 is found to be under operation, the program goes to the step S9. Further, if the ABS control means 63 is found to be the state that the ABS operation has ended, the program goes to the step S13. At the step S5 where the ABS control is not operated, the brake ECU 60 obtains the information on the possible generable maximum regeneration braking force FEmax1 from the hybrid ECU 50 through communications and at the step S6, investigation is made whether the insufficient braking force which is calculated by subtracting the basic hydraulic pressure braking force FB from the required operating force or the target breaking force FR can be covered by the maximum regeneration braking force FEmax1. If the value is found to be sufficient, the program goes to the step S7 and sets the regeneration braking force instruction value FE1 to be the value of insufficient braking force (=FR−FB) and if the value is found to be insufficient, the program goes to the step S8 and sets the FE1 for the regeneration braking force to be the maximum regeneration braking force FEmax1. The steps S7 and S8 merge at the step S18.

At the step S9 where the ABS control is under operation, the final value calculating means 64 renews the regeneration allowing braking force FH by using the latest required or target braking force FR. The processing of the step S9 is executed every time the ABS control is found to be under operation and accordingly, the required or target braking force FR at any ending point of the ABS control by the ABS control means 63 becomes automatically the regeneration allowing braking force FH. The ABS control means 63 determines the target braking force FR (ABS) under ABS control according to a predetermined determining method at the step S10 and replaces the target braking force FR (ABS) under ABS control with the target braking force FR at the step S11. At the next step S12, the regeneration braking force instruction value FE1 is set to be zero and the program merges at the step S18.

At the step S13 where the ABS control is ended, the regeneration allowing means 65 calculates the ABS estimated available force by subtracting the target braking force FR from the regeneration allowing braking force FH obtained at the time the operation of the ABS control means 63 ended. At the next step S14, the allowing maximum regeneration braking force FEmax2 is calculated. The allowing maximum regeneration braking force FEmax2 Is obtained by using the function f(FK) corresponding to the magnitude of the ABS estimated available force FK. Thus obtained maximum regeneration braking force FEmax2 means the maximum value within a range that the likelihood of re-starting of the ABS control by the ABS control means 63 may not be increased. At the next step S15, investigation is made whether the insufficient braking force which is calculated by subtracting the basic hydraulic pressure braking force FB from the target breaking force FR can be covered by the maximum regeneration braking force FEmax2. If the value is found to be sufficient, the program goes to the step S16 and sets the regeneration braking force instruction value FE1 to be the value of insufficient braking force (=FR−FB) and if the value is found to be insufficient for covering the maximum regeneration braking force FEmax2, the program goes to the step S8 and sets the FE1 for the regeneration braking force to be the maximum regeneration braking force FEmax2. The steps S16 and S17 merge at the step S18.

When the regeneration braking force instruction value FE1 is set at any of the steps S7, S8, S12, S16 and S17, the flow merges at the step S18. At the step S18, the regeneration braking force instruction value FE1 is sent to the hybrid ECU 50. Then the regeneration brake device A is operated thereby to generate the regeneration braking force FE. At the step S19, the brake ECU 60 obtains the information on the regeneration braking force execution value FE2 from the hybrid ECU 50. Then at the step S20, the brake ECU 60 calculates the control hydraulic pressure braking force FC by subtracting the basic hydraulic pressure braking force FB and the regeneration braking force execution value from the required braking force FR and controls the hydraulic pressure control unit 25 so that the control hydraulic pressure braking force FC can be generated. Thus, one cycle of the processing flow for brake control ends. And this flow is repeated again from the step S1 every time a predetermined time period passes.

Figure 4:
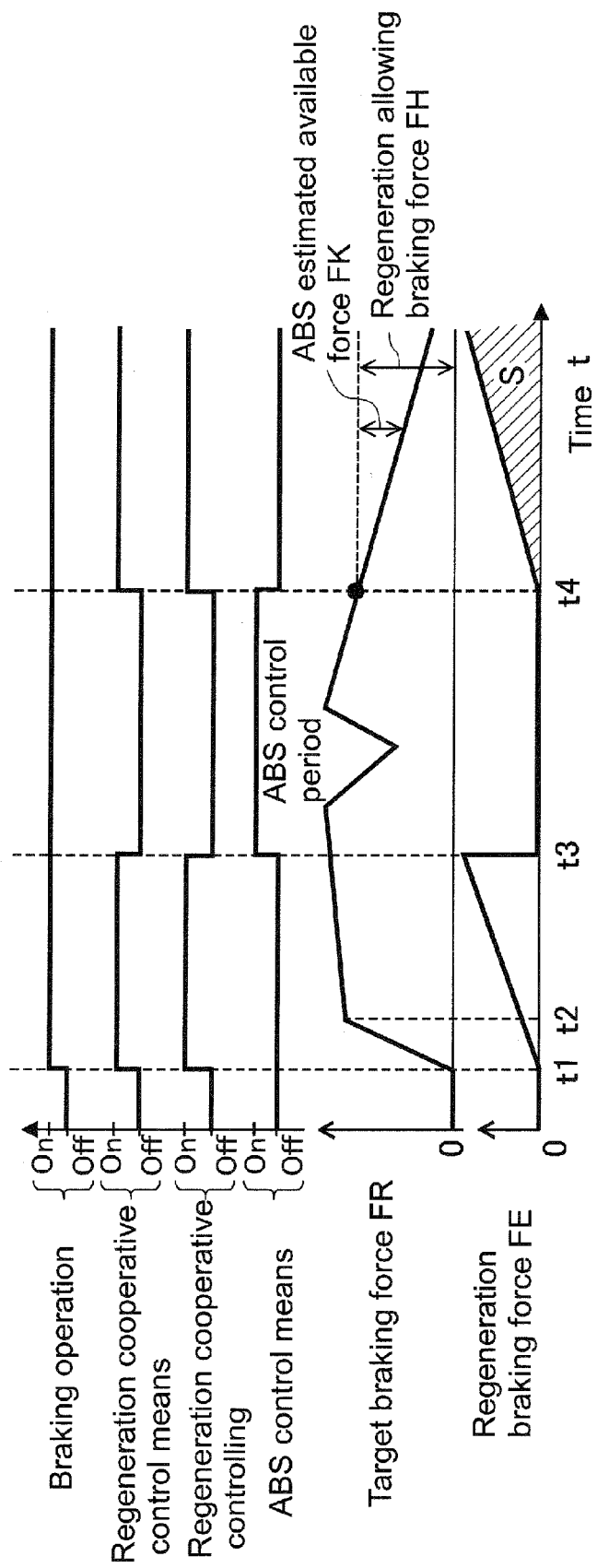
FIG. 4 is a time chart showing that the ABS control means 3 is operated during one braking operation period according to the vehicle brake device of the first embodiment.

Next, the operation of the vehicle brake device 1 according to the first embodiment will be explained hereinafter. FIG. 4 shows the operation time chart of the ABS control means 63 of the vehicle brake device 1 started in one braking operation period. The horizontal axis in FIG. 4 indicates a common time "t" and various operational change states such as ON/OFF state of braking operation, ON/OFF state of regeneration cooperative control means, ON/OFF state of regeneration cooperative control, ON/OFF state of ABS control means, change of target braking force FR and change of regeneration braking force FE are shown from the top to the bottom of the chart in FIG. 4.

In FIG. 4, when the brake pedal 21 is depressed at the time "t1" (OFF to ON state), the target braking force FR is generated and the regeneration cooperative control means 62 starts operation control (OFF to ON state) and the regeneration cooperative control is immediately started to generate hydraulic pressure braking force and the regeneration braking force FE. Immediately after the time "t1" passed, the brake pedal 12 is depressed quickly and after the time "t2", the pedal 21 is gradually depressed. The target braking force FR is varied corresponding to the depression amount of the brake pedal. The regeneration cooperative control means 62 controls the total braking force which is the sum of the hydraulic pressure braking force and the regeneration braking force FE to agree to the target braking force FR.

At the time "t3", when one of the vehicle wheels 7RL, 7RR, 7FL and 7FR tends to be locked, the ABS initiating judging condition is established. Then the cooperative control means 62 stops the operation thereof and the ABS control means 63 starts the control operation (OFF to ON). The ABS control means 63 prohibits the generation of regeneration braking force FE and defines the value of the target braking force under ABS control FR (ABS) (not shown), which is smaller than the value of the target braking force FR thereby controlling the hydraulic pressure braking force to agree to the target braking force under ABS control FR (ABS).

At the time "t4", when the locking tendency at the one of the vehicle wheels ends, the ABS control means 63 stops the operation and the cooperative control means 62 restarts the operation thereof. The total braking force generated at this point agrees to the target braking force FR and this amount is calculated to be the regeneration allowing braking force FH as shown in FIG. 4. According to the example in FIG. 4, the amount of the target braking force FR decreases in a monotonous way after the time "t4" passed and the ABS estimated available force FK obtained by subtracting the target braking force FR from the regeneration allowing braking force FH is gradually increased. Accordingly, after the time "t4", the generation of the regeneration braking force FE which corresponds to the magnitude of the ABS estimated available force FK is allowed thereby to perform regeneration cooperative control.

Figure 5A:
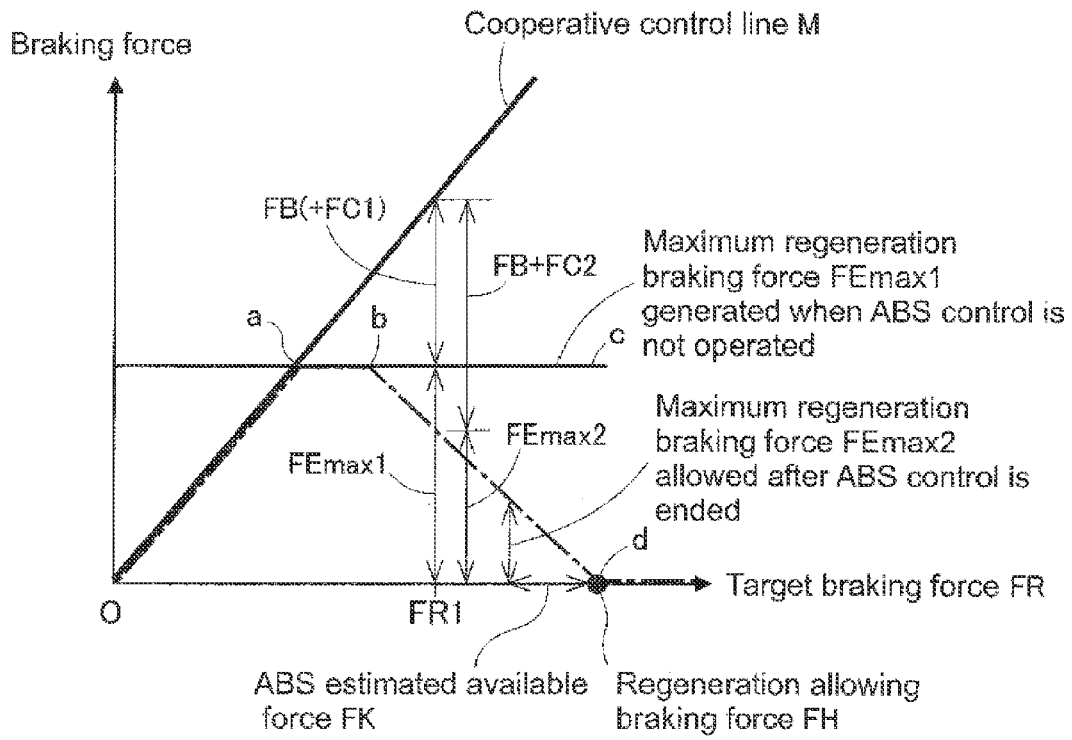
Figure 5B:
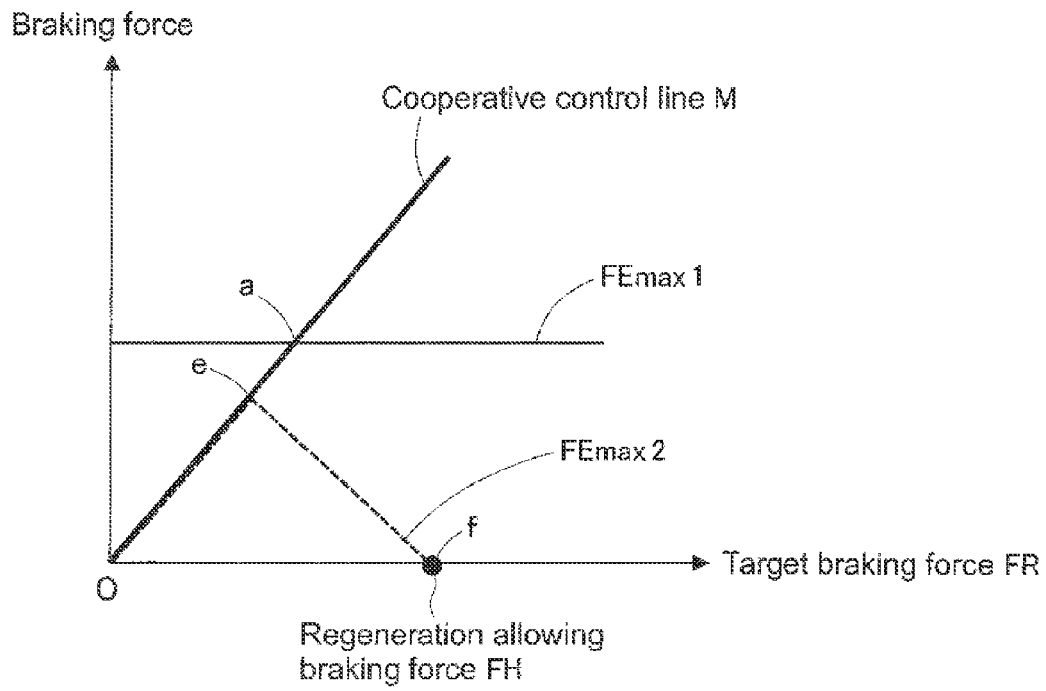
Figure 6A:
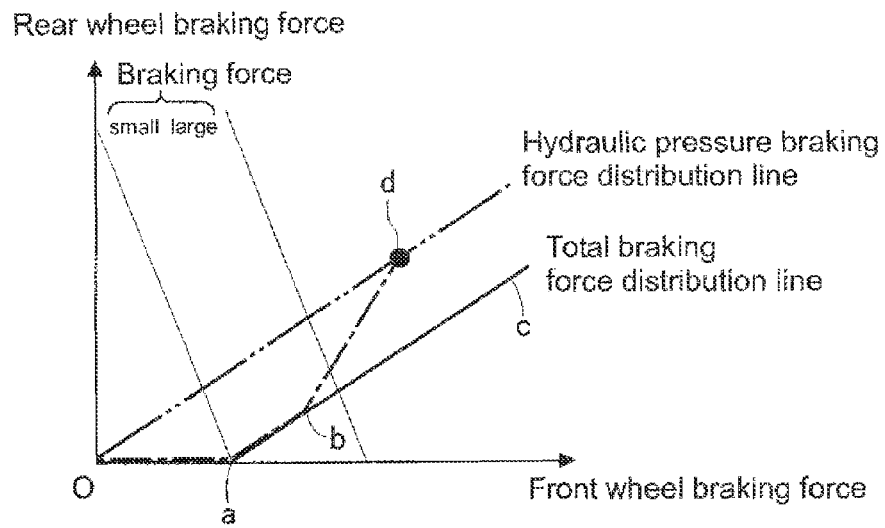
Figure 6B:
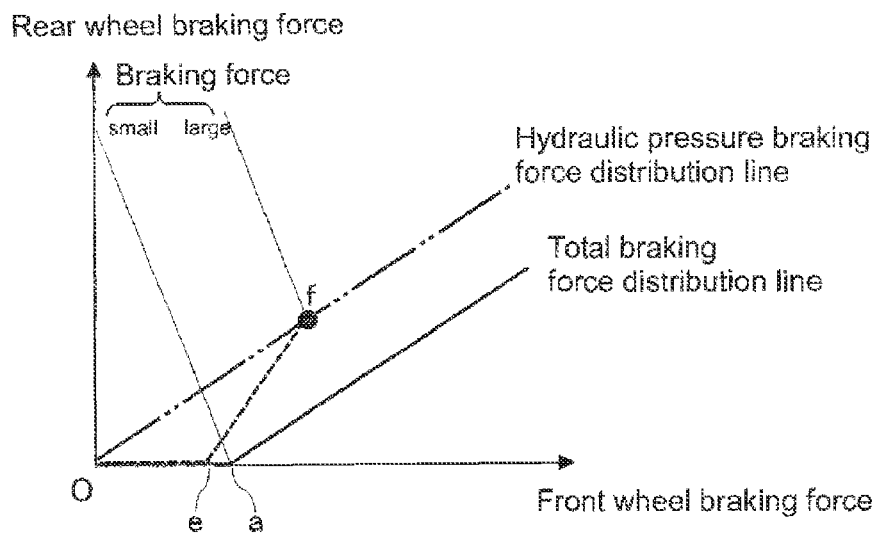

Next, the distribution of the braking force will be explained. In FIG. 5, an example of distribution of the hydraulic pressure braking force and the regeneration braking force FE is illustrated. FIG. 5A indicates the case that the regeneration allowing braking force FH is relatively large and FIG. 5B indicates the case that the regeneration allowing braking force FH is relatively small. In order to simply explain, the generable maximum regeneration braking force FEmax1 is set to be constant in FIG. 5. FIG. 6 indicates the front-rear braking force distribution line and FIG. 6A indicates the case that the regeneration allowing braking force FH is relatively large and FIG. 6B indicates the case that the regeneration allowing braking force FH is relatively small.

The horizontal axis in FIG. 5A indicates the target braking force FR and the vertical axis indicates the generating braking force. The cooperative control means 62 controls the target braking force FR and the generating braking force to agree to each other and accordingly, the cooperative control is performed on the cooperative line M which crosses the origin O with the inclination of 45°. In the range from the origin O of the cooperative line M to the point "a" which corresponds to the maximum regeneration braking force FEmax1, the basic hydraulic pressure is not generated at the master cylinder 23 as explained and regeneration braking force FE is generated in this range with priority. In the range beyond the point "a" on the cooperative line M, the basic hydraulic pressure braking force FB is generated and if such braking force is still insufficient, the control hydraulic pressure braking force FC is generated by the brake ECU 60. The generable regeneration braking force FEmax1 under the ABS being not operated is indicated with a flat (horizontal) solid line and passes through the points "a", "b" and "c".

On the other hand, the maximum regeneration braking force FEmax2 allowed after the ABS operation changes partially in trapezoidal shape as indicated with the one-dot chain line. In other words, the maximum regeneration braking force FEmax2 agrees with the cooperative line M from the origin O to the point "a" and agrees with the line of maximum regeneration braking force FEmax1 from the point "a" to the point "b". after the point "b", the maximum regeneration braking force FEmax2 decreases as the target braking force FR increases and eventually becomes zero at the point "d" where the target braking force FR agrees with the regeneration allowing braking force FH.

Accordingly, the cooperative control means 62 changes the distribution ratio of the hydraulic pressure braking force and the regeneration braking force FE between the time the ABS control is not performed and the time after the ABS control ended. For example, when the target braking force FR equals to the value FR1 (FR=FR1) and the ABS control is not performed, the cooperative control means 62 preferentially generates the maximum regeneration braking force FEmax1 and the deficiency of the force to the target braking force FR is supplemented by the basic hydraulic pressure braking force PB. If still insufficient for the target braking force, the cooperative control means 62 generates the control hydraulic pressure FC1. When the target braking force FR equals to the value FR1 (FR=FR1) but after the ABS control ended, the cooperative control means 62 preferentially generates the maximum regeneration braking force FEmax2 and the deficiency of the force to the target braking force FR is supplemented by the basic hydraulic pressure braking force PB and the control hydraulic pressure FC2 which are generated by the cooperative control means 62. As is the example explained above, the cooperative control means 62 limits the value of the maximum regeneration braking force FEmax1 generated when the ABS control was not performed to the value FEmax2 after the ABS control ended.

It is noted that when the regeneration allowing braking force FH is relatively small due to a bad road surface condition or the like, as shown in FIG. 6B with dotted line, the allowable maximum regeneration braking force FEmax2 receives restrictions before reaching to the point "a" of the cooperative line M. The line of the allowable maximum regeneration braking force FEmax2 bends at the point "e" which is located before the point "a" and thereafter the allowable maximum regeneration braking force FEmax2 decreases as the target braking force FR increases and reaches at the point "f" where the target braking force FR agrees with the regeneration allowing braking force FH thereby forming a triangular shape by the points O, "e" and "f". In such case, the cooperative control means 62 further remarkably limits the generation of the regeneration braking force FE after the ABS control ended.

Next, FIG. 6A shows the front-rear braking force distribution diagram and the horizontal axis indicates the front wheel braking force and the vertical axis indicates the rear wheel braking force. The diagram indicates that the total braking force is greater in the upper right area in the drawing than in other area. In the drawing, the two-dotted chain line crossing the origin O and having approximately a constant inclination indicates the hydraulic pressure braking force distribution line connecting in turn the operating points where the regeneration braking force FE is not used. The inclination of the distribution line indicates the distribution ratio between the front and rear sides of the braking force of the hydraulic brake device B. In this example, relatively large braking force is generated at the front drive wheels 7FR and 7FL. The solid line crossing the origin O, horizontally moving from the origin O to the point "a", then bending at the point "a" and moving in parallel to the hydraulic pressure braking force distribution line, passing through the point "b" and reaching to the point "c" indicates the total braking force distribution line connecting in turn the operating points where the regeneration braking force FE is preferentially used. The points "a" through "d" in FIG. 6A correspond to the points "a" through "d" in FIG. 5A.

In the diagram in FIG. 5A, only the regeneration braking force FE is generated from the origin O to the point "a". This corresponds to the area of the operating point moving from the origin O to the point "a" by the generation of the regeneration braking force FE only at the front drive wheels 7FR and 7FL in FIG. 6. When the regeneration braking force FE is saturated to the maximum regeneration braking force FEmax1 at the point "a" the deficiency of the braking force is simply supplemented by the hydraulic pressure braking force when the ABS control is not performed and the operating point moves to the point "c" through the point "b" which is located at rightly inclined upward area as shown in FIG. 6A. On the contrary, after the ABS control ended, the limitation of the generation of the regeneration braking force FE starts at the point "b" and the operating point moves with a sharp angle from the point "b" as indicated with the one-dotted chain line to the point "d" on the hydraulic pressure braking force distribution line in FIG. 6A to restrict the generation of the regeneration braking force FE.

It is noted that when the regeneration allowing braking force FH is relatively small, as shown in FIG. 6B, the limitation of generation of the regeneration braking force FE starts at the point "e" which is located before the point "a" and the operating point moves from the point "e" to the point "f" to restrict the generation of the regeneration braking force FE (Points "e" and "f" in the line of FIG. 6B correspond to the points "e" and "f" in the line of FIG. 5B.)

According to the vehicle brake device 1 of the first embodiment of the invention, after the re-starting of the operation of the cooperative control means 62, which is after the time t4 in FIG. 4 and the target braking force FR is less than the regeneration allowing braking force FH, only at this timing, the generation of the regeneration braking force is allowed to generate the regeneration braking force within a range that the possibility of re-starting of the ABS control by the ABS control means 63 would not increase. Accordingly, the regeneration efficiency can be improved by the amount corresponding to the hatched area S in the regeneration braking force FE in FIG. 4 compared to the conventional device.

It is noted here that after the cooperative control means 62 re-started, if the target braking force FR is equal to or more than the regeneration allowing braking force FH, the likelihood of re-starting of the ABS control by the ABS control means 63 is about the same as the likelihood of the conventional device, and accordingly, the generation of the regeneration braking force FE is not allowed as is the case of conventional device. Thus, even if the ABS control means 63 is re-started, regeneration braking force FE is not necessarily changed to the hydraulic pressure braking force as is the case of conventional device and the braking force is continuously applied not to give any uncomfortable feeling to the operator of the vehicle.

Further, the regeneration allowing means 65 limits the magnitude of the allowing regeneration braking force FE in response to the magnitude of the ABS estimated available force FK which is calculated by subtracting the target braking force FR from the regeneration allowing braking force FH. In other words, when the target braking force FR is far largely decreased than the regeneration allowing braking force FH, a large regeneration braking force FE is generated and when the target braking force FR is decreased with a small amount compared to the regeneration allowing braking force FH, a small regeneration braking force FE is generated. Accordingly, if the regeneration braking force FE is generated after the ABS control means 63 is tentatively ended and if the ABS control means 63 should be re-started, the amount of the regeneration braking force FE which is to be changed to the hydraulic pressure braking force is decreased stochastically to minimize an uncomfortable feeling occurred at the time of discontinuity of application of the braking force due to the changing of the type of braking force.

Next, the second embodiment in which the regeneration allowing braking force FHmin deciding method is different from that of the first embodiment will be explained with the points different from the first embodiment. The device structure of the second embodiment is the same with the device structure of the first embodiment. The different point is that the brake ECU 60 of the first embodiment includes the final value calculating means 64 but according to the second embodiment, the brake ECU 60 of the second embodiment includes a minimum value calculating means instead of using the final value calculating means.

The minimum value calculating means calculates the minimum value of the target braking force FR, while the ABS control is being performed for an ABS control period, to be the regeneration allowing braking force FHmin, when the ABS control means 63 is operated over the ABS control period within the one braking operation period where the brake pedal 21 is continuously operated. The minimum value calculating means observes the change of the target braking force FR at certain time points during the ABS control period and memorizes the minimum value at the respective time points. The minimum value memorized at the time point when the ABS control period ended is calculated to be the regeneration allowing braking force FHmin.

It is noted here that the regeneration allowing braking force FHmin indicates the minimum target braking force FR in which the operation of ABS control is not ended within the ABS control period and indicates the locking tendency still continues at this time point. Accordingly, even if the ABS control means 63 ended the operation, if the target braking force FR increases to be equal to or more than the value of regeneration allowing braking force FHmin, the ABS control starting condition is established and the likelihood of re-starting of the operation of ABS control means 63 will be considered to be increased. In other words, the regeneration allowing braking force FHmin is considered to be an indication which indicates the possible re-starting of ABS control by the ABS control means 63. The regeneration allowing braking force FHmin according to the second embodiment is the value set with the same intention with the regeneration allowing braking force FH according to the first embodiment.

Figure 7:
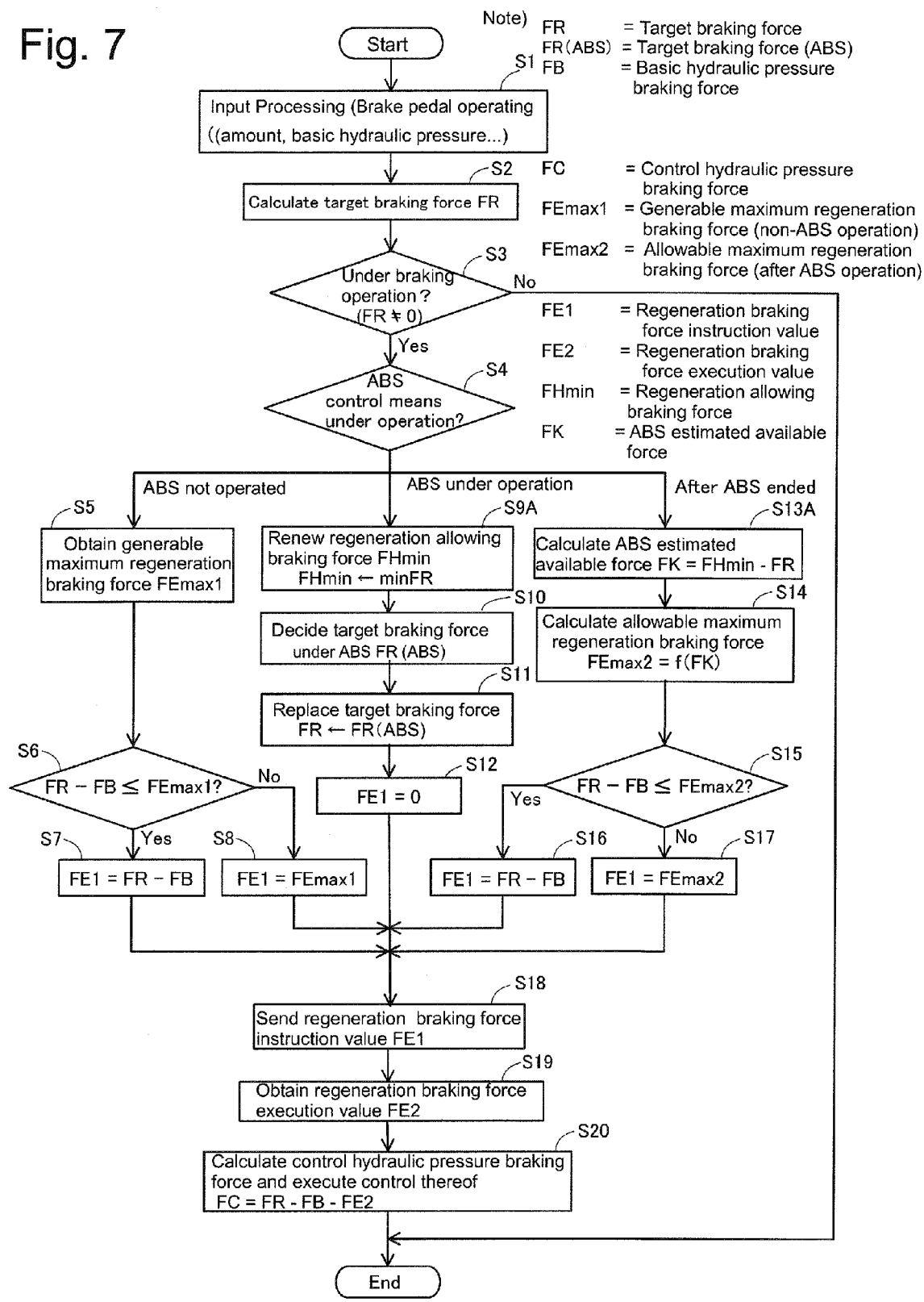
FIG. 7 is a flowchart explaining the processing of flow for brake control by brake ECU (brake control device) according to a second embodiment.

FIG. 7 shows the flowchart explaining the processing flow of the braking control by the brake ECU 60 according to the second embodiment. As will be understood when comparing the flow in FIG. 3 according to the first embodiment, in this second embodiment, the steps S9A and 13A are modified from the steps S9 and S13 of the first embodiment. All other steps are the same with those of the first embodiment. In detail, at the step S9A, the minimum value calculating means renews the regeneration allowing braking force FHmin using the minimum value min(FR) of the target braking force FR up to that time point. By repeating the processing of the step S9A during every ABS control operation, the minimum value of the target braking force FR in the ABS control period is automatically calculated to be the regeneration allowing braking force FHmin any time the ABS control ended. Further, according to the step S13A of the second embodiment, the regeneration allowing means 65 calculates the ABS estimated available force FK by subtracting the target braking force FR from the regeneration allowing braking force FHmin obtained at the time the ABS control by the ABS control means 63 ended.

Figure 8:
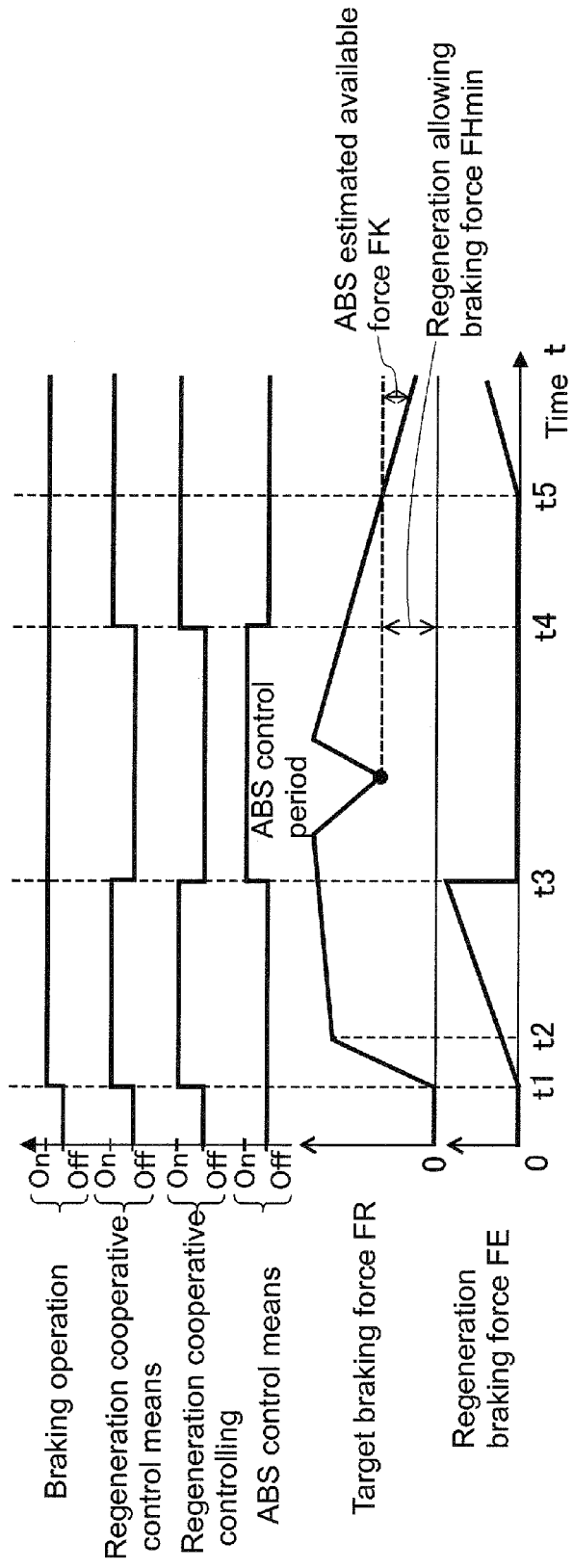
FIG. 8 is a time chart showing that the ABS control means is operated during one braking operation period according to the vehicle brake device of the second embodiment.

Next, the operation of the vehicle brake device according to the second embodiment will be explained hereinafter. FIG. 8 shows the time chart of the operation of the vehicle brake device according to the second embodiment in which the ABS control means 63 is operated in mid-flow of the one braking operation period. FIG. 8 shows the time chart in which the brake pedal 21 is operated under the same condition with the time chart of FIG. 4 according to the first embodiment. As illustrated, the vehicle brake device according to the second embodiment is operated as same as the operation of the first embodiment from the time "t1" to the time "t4". At the time "t4", the ABS control means 63 ended the operation due to the dissolution of the locking tendency and the cooperative control means 62 is re-started. Then the minimum value calculating means calculates the minimum value of the target braking force FR in the ABS control period to be the regeneration allowing braking force FHmin. The value of this regeneration allowing braking force FHmin is set to be smaller than the value of regeneration allowing braking force FH according to the first embodiment.

The example shown in FIG. 8 indicates that the target braking force FR decreases monotonously after the time point "t4" and that the value of the target braking force FR is larger than the value of the regeneration allowing braking force FHmin from the time "t4" up to the time "t5". Accordingly, the regeneration allowing means 65 does not allow the generation of the regeneration braking force FE. At the time "t5", the values of the target braking force FR and the regeneration allowing braking force FHmin agree to each other and thereafter, the value of the target braking force FR becomes smaller than the value of the regeneration allowing braking force FHmin and the ABS estimated available force FK increases gradually. Accordingly, the generation of the regeneration braking force FE corresponding to the magnitude of the ABS estimated available force FK is allowed only after the time "t5" where the target braking force FR falls within the value of regeneration allowing braking force FHmin and the cooperative control begins.

The effect for improving the regeneration efficiency according to the second embodiment is equal to or less than the effect according to the first embodiment. However, another effect that the influence in case of re-starting of operation of the ABS control means 63 can be reduced is expected. Explaining the effect in more detail, the values of the regeneration allowing braking forces FH and FHmin are the guidelines for indicating the time of re-starting the operation of the ABS control means 63 and the likelihood of establishment of the ABS starting condition is not necessarily zero even the braking force is equal to or less than the values FH or FHmin if the road surface condition becomes worse. Accordingly, assuming that the ABS control is re-started after the time "t4", the amount of regeneration braking force FE to be changed to the hydraulic pressure braking force according to the second embodiment is smaller than that of the first embodiment. Accordingly, the uncomfortable feeling that the operator of the vehicle feels due to the discontinuity of application of the braking force can be further more reduced compared to the case of the first embodiment.

Next, the third embodiment in which the start of the operation of the regeneration allowing means after the ABS control ended is retarded will be explained mainly the points different from the first embodiment. The structure of the vehicle brake device according to the third embodiment is the same as that of the vehicle brake device according to the first embodiment except the regeneration allowing means of the brake ECU 60. In detail, the regeneration allowing means according to the third embodiment is operated after further certain time T passed from the time when the ABS control period ended within the one braking operation period and the cooperative control means 62 re-started the operation. This means the operation of the regeneration allowing means started with a delay of the time T compared to the starting of the regeneration allowing means according to the first embodiment.

Figure 9:
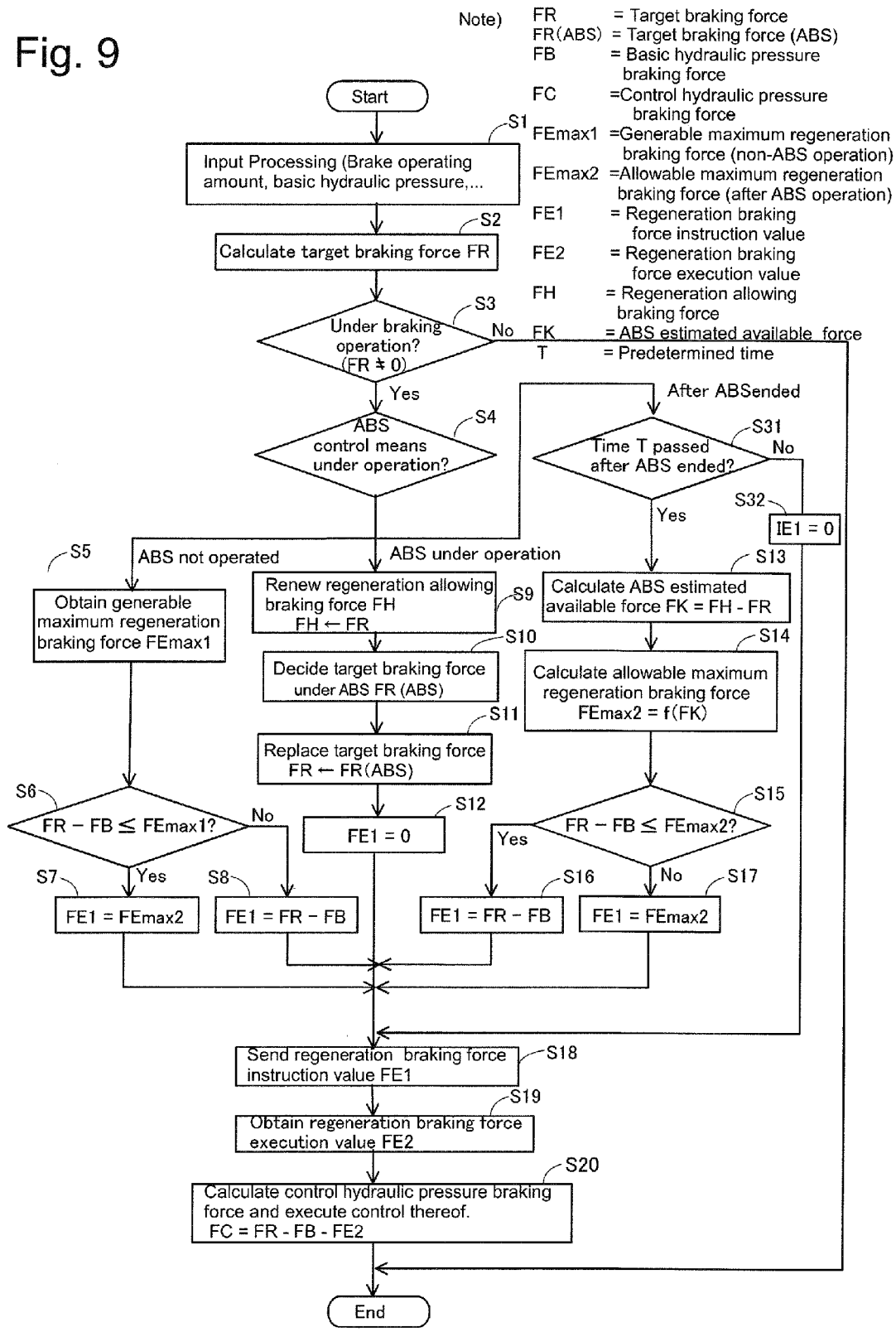
FIG. 9 is a flowchart explaining the processing of flow for brake control by brake ECU (brake control device) according to a third embodiment.

FIG. 9 shows a flowchart explaining the processing flow of the braking control by the brake ECU 60 according to the third embodiment. As will be understood when comparing the flowchart shown in FIG. 3 according to the first embodiment, in this third embodiment, the steps S31 and S32 are added to the flowchart of FIG. 3 and other steps are the same with those in FIG. 3. When the ABS control ended at the step S4, the program goes to the step S31 and at the step S31 whether or not the certain time T has passed after the ABS control ended is judged. If it is judged that the certain time T has not passed the program goes to the step S32 to set the regeneration braking force instruction value FE1 to be zero (0) merges at the step S18. If it is judged that the time T has passed the program goes to the step S13 and thereafter to calculate the ABS estimated available force FK and the allowable maximum regeneration braking force FEmax2.

Figure 10:
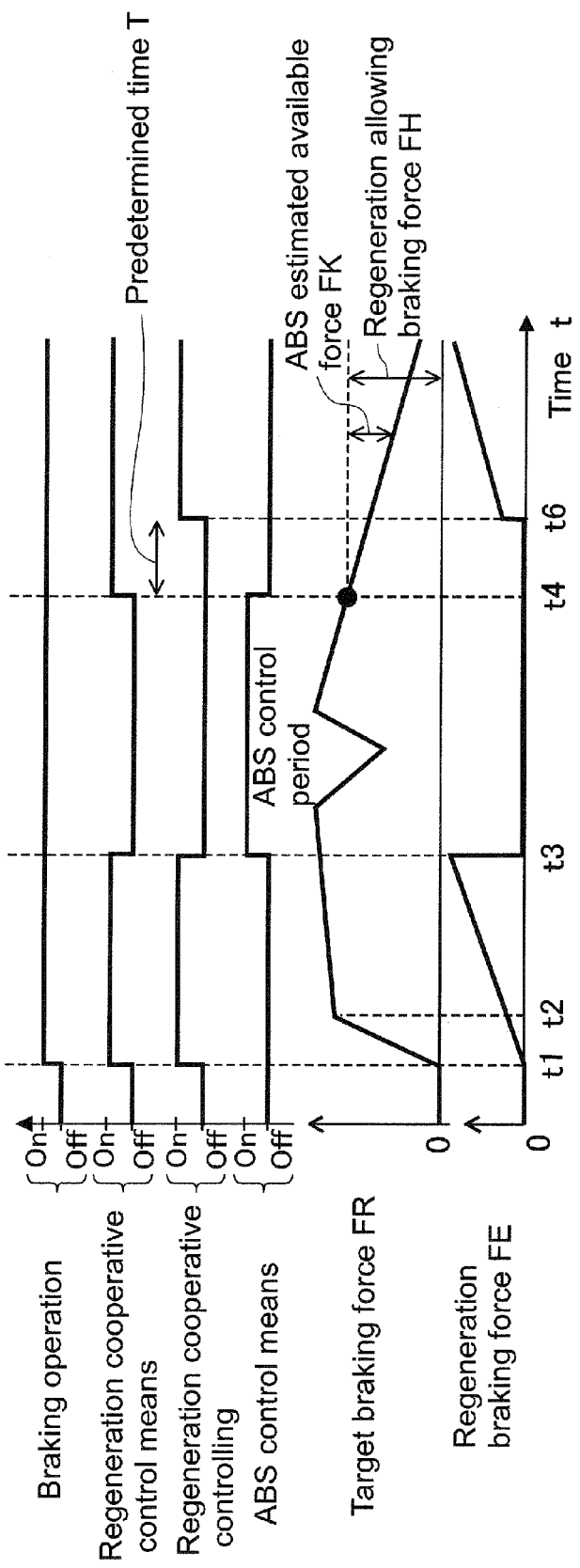
FIG. 10 is a time chart showing that the ABS control means is operated during one braking operation period according to the vehicle brake device of the third embodiment.

Next, the operation of the vehicle brake device according to the third embodiment will be explained. FIG. 10 shows the time chart of the operation of the vehicle brake device according to the third embodiment in which the ABS control means 63 is operated in mid-flow of the one braking operation period. FIG. 10 shows the time chart in which the brake pedal 21 is operated under the same condition with the time chart of FIG. 4 according to the first embodiment. As illustrated, the vehicle brake device according to the third embodiment is operated as same as the operation of the first embodiment from the time "t1" to the time "t4" in which the regeneration allowing braking force FH is obtained. At the time "t4", the ABS control means 63 ended the operation due to the dissolution of the locking tendency and the cooperative control means 62 is re-started. However, the regeneration allowing means is not started and accordingly, the cooperative control is not performed. At the time "t6" when the time T passed from the time "t4", the regeneration allowing means started the operation and thereafter the regeneration braking force FE which corresponds to the ABS estimated available force FK is generated.

According to the vehicle brake device of the third embodiment, the operation under a transitional condition where the ABS control means 63 ended the operation and operation is transferred to the cooperative control means 62 does not become complicated and the operation is stabilized to suppress the influence by various types of disturbance.

It is noted that according to the embodiments explained above, allowable maximum regeneration braking force FEmax2 after the ABS control ended can be obtained by the function f(FK) corresponding to the magnitude of the ABS estimated available force FK. The function f(FK) can be freely set. Qualitatively, if a large regeneration braking force FE is allowed, the regeneration efficiency can be highly improved. However, under such situation the influence when the ABS control means 63 is re-started becomes large. Reversely, if a small regeneration braking force FE is allowed, the regeneration efficiency cannot be highly improved. However, the effect that the influence when the ABS control means 63 is re-started can be reduced is expected. Various modifications and applications can be possible within the scope of the invention.

The invention claimed is:

1. A vehicle brake device comprising:
   a hydraulic brake device which adjustably applies a hydraulic pressure braking force to vehicle wheels;
   a regeneration brake device which applies a regeneration braking force to a drive wheel of the vehicle wheels driven by a generator/motor;
   a brake control device including a target obtaining means for obtaining a target braking force corresponding to an operating amount of a brake operating member, a cooperative control means for cooperatively controlling the hydraulic brake device and the regeneration brake device to have a total braking force, which is a sum of the hydraulic pressure braking force and the regeneration braking force, become equal to the target braking force and an anti-lock brake control means for prohibiting a generation of the regeneration braking force by stopping the operation of the cooperative control means when the cooperative control means is in operation and a locking tendency is shown at the one of the vehicle wheels and suppressing a generation of locking at the one of the vehicle wheels by adjusting the hydraulic pressure braking force,
   wherein the brake control device further includes a minimum value calculating means that observes and memorizes a minimum value of the target braking force during an ABS control operation operated within one braking operation and sets the minimum value as the regeneration allowing braking force which is used after the completion of the ABS control operation such that after the cooperative control is restarted within the one braking operation a regeneration allowing means allows the generation of the regeneration braking force only when the target braking force is less than a value of the regeneration allowing braking force.

2. The vehicle brake device according to claim 1, wherein the regeneration allowing means is operated after a predetermined time passed after the end of the ABS control period within the one braking operation period and the cooperative control means restarted.

* * * * *